US011462726B2

(12) United States Patent
Uka et al.

(10) Patent No.: US 11,462,726 B2
(45) Date of Patent: Oct. 4, 2022

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Youichirou Uka, Hyogo (JP); Rie Matsuoka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 16/629,205

(22) PCT Filed: Aug. 21, 2018

(86) PCT No.: PCT/JP2018/030774
§ 371 (c)(1),
(2) Date: Jan. 7, 2020

(87) PCT Pub. No.: WO2019/064995
PCT Pub. Date: Apr. 4, 2019

(65) Prior Publication Data
US 2020/0203708 A1 Jun. 25, 2020

(30) Foreign Application Priority Data
Sep. 27, 2017 (JP) .............................. JP2017-186835

(51) Int. Cl.
*H01M 4/131* (2010.01)
*H01M 4/133* (2010.01)
(Continued)

(52) U.S. Cl.
CPC ............ *H01M 4/131* (2013.01); *H01M 4/133* (2013.01); *H01M 4/364* (2013.01); *H01M 4/525* (2013.01); *H01M 4/62* (2013.01); *H01M 10/0525* (2013.01)

(58) Field of Classification Search
CPC ....... H01M 10/0525; H01M 2004/028; H01M 4/131; H01M 4/133; H01M 4/364; H01M 4/525; H01M 4/62; H01M 4/625
See application file for complete search history.

(56) References Cited

U.S. PATENT DOCUMENTS

| 2017/0018749 A1 | 1/2017 | Sugawara |
| 2017/0222212 A1 | 8/2017 | Hong et al. |
| 2018/0301704 A1* | 10/2018 | Uchiyashiki ............ C08F 20/26 |

FOREIGN PATENT DOCUMENTS

| CN | 103201026 A | 7/2013 |
| JP | H05-174810 A | 7/1993 |

(Continued)

OTHER PUBLICATIONS

M. Y. Song, R. Lee, I. Kwon. Synthesis by sol-gel method and electrochemical properties of LiNi1—yAlyO2 cathode materials for lithium secondary battery, Solid State Ionics 156 (2003) 319-328.*

(Continued)

*Primary Examiner* — Carlos Barcena
(74) *Attorney, Agent, or Firm* — WHDA, LLP

(57) ABSTRACT

A positive electrode includes a positive electrode current collector and a positive electrode mixture layer disposed on the current collector. The positive electrode mixture layer includes a lithium transition metal composite oxide containing 50 mol % or more Ni relative to the total number of moles of metal element or elements except Li, a conductive carbon material, and an adhesion improver capable of attaching to the lithium transition metal composite oxide and the carbon material. The adhesion improver contains a (Continued)

Lewis acidic group, a Lewis basic group, and an aromatic ring-containing hydrophobic group.

4 Claims, 1 Drawing Sheet

(51) Int. Cl.
  *H01M 4/36* (2006.01)
  *H01M 4/525* (2010.01)
  *H01M 4/62* (2006.01)
  *H01M 10/0525* (2010.01)

(56) References Cited

FOREIGN PATENT DOCUMENTS

| JP | 2005-263608 A | 9/2005 |
| JP | 2006-302617 A | 11/2006 |
| JP | 2010-064944 A | 3/2010 |
| JP | 2016-177910 A | 10/2016 |
| JP | 2017-514290 A | 6/2017 |
| WO | 2012/036172 A1 | 3/2012 |
| WO | 2015/137461 A1 | 9/2015 |
| WO | 2016/199653 A1 | 12/2016 |

OTHER PUBLICATIONS

Z. Tang, J. Bao, Q. Du, Y. Shao, M. Gao, B. Zou, C. Chen.Surface Surgery of the Nickel-Rich Cathode Material LiNi0.815Co0.15Al0.035O2: Toward a Complete and Ordered Surface Layered Structure and Better Electrochemical Properties, ACS Appl. Mater. Interfaces 2016, 8, 34879-34887.*

Translation of International Search Report dated Oct. 9, 2018, issued in counterpart Application No. PCT/JP2018/030774. (2 pages).

English translation of Chinese Search Report dated Jul. 25, 2022 issued in counterpart CN Application No. 201880051285.8.

* cited by examiner

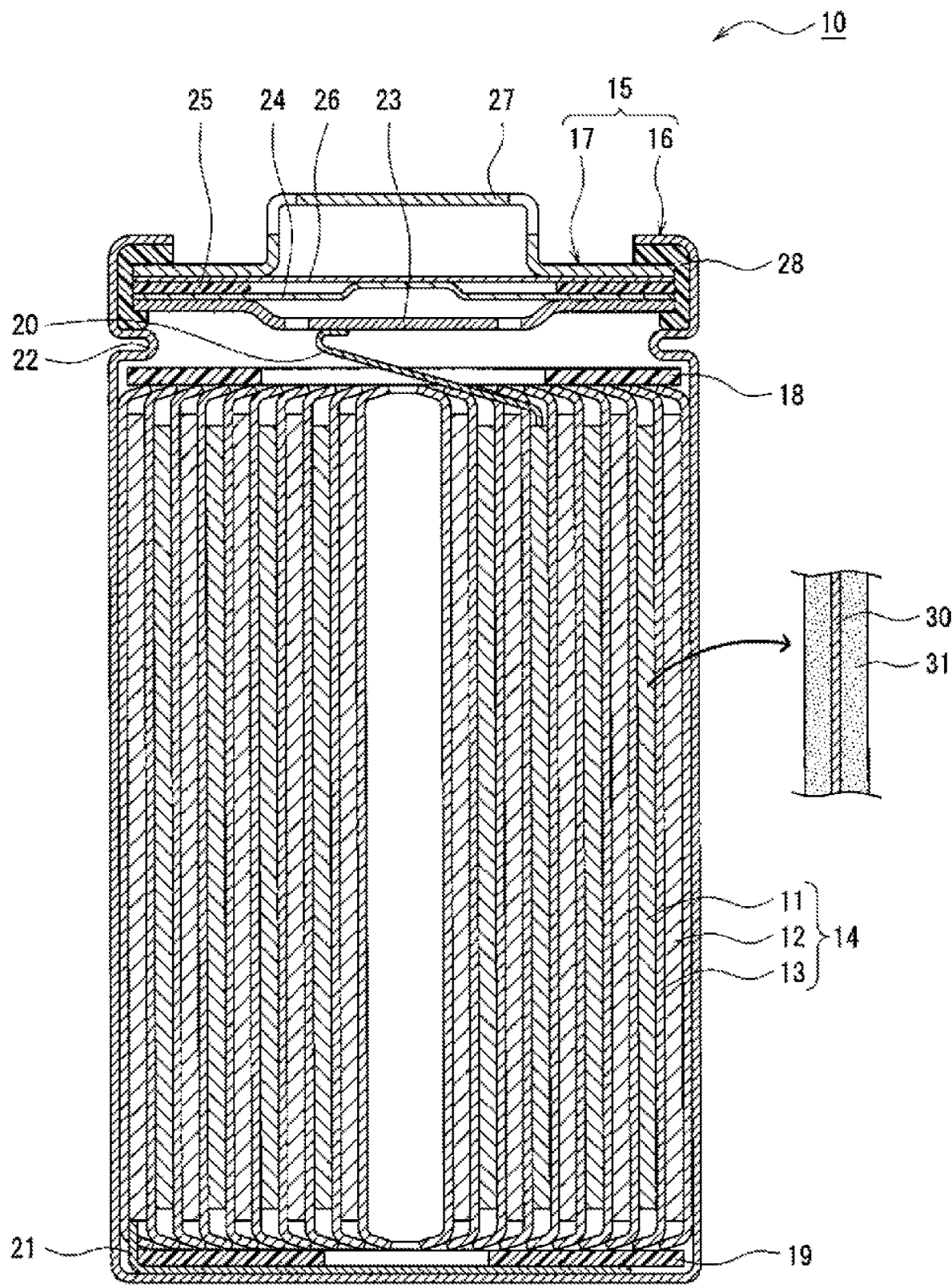

POSITIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present disclosure relates to a positive electrode for nonaqueous electrolyte secondary batteries, and to a nonaqueous electrolyte secondary battery.

BACKGROUND ART

Positive electrodes in nonaqueous electrolyte secondary batteries such as lithium ion batteries have a current collector and a mixture layer disposed on the current collector. The mixture layer is composed of an active material, a conductive carbon material, and a binder for binding the active material and the carbon material together. For example, PTL 1 discloses an electrode mixture layer formed from an electrode-forming composition containing an active material, a conductive carbon material, a binder and an anionic dispersant.

Lithium transition metal composite oxides are generally used as positive electrode active materials. Because lithium transition metal composite oxides have low electron conductivity, conductive carbon materials are added to the mixture layers to ensure the electron conductivity of the mixture layers.

CITATION LIST

Patent Literature

PTL 1: Japanese Published Unexamined Patent Application No. 2016-177910

SUMMARY OF INVENTION

However, the volume change of the positive electrode active material caused by charging and discharging of the battery weakens the degree of contact between the active material and the carbon material, sometimes resulting in a decrease in the conductivity of the mixture layer. In this case, the mixture layer comes to have an increased resistance, and the battery capacity is lowered. In recent years, Ni-excess lithium transition metal composite oxides attract attention as positive electrode active materials with high energy density. Even if such an active material is used, however, a sufficient battery capacity cannot be ensured when a drop in the conductivity of the mixture layer occurs.

An object of the present disclosure is that a Ni-excess lithium transition metal composite oxide used as a positive electrode active material maintains a good electrical connection with a carbon material and thereby the battery attains a small decrease in capacity after charging and discharging cycles.

A positive electrode for nonaqueous electrolyte secondary batteries according to an aspect of the present disclosure includes a current collector and a mixture layer disposed on the current collector, wherein the mixture layer includes a lithium transition metal composite oxide containing 50 mol % or more Ni relative to the total number of moles of metal element or elements except Li, a conductive carbon material, and an adhesion improver capable of attaching to the lithium transition metal composite oxide and the carbon material, and the adhesion improver contains a Lewis acidic group, a Lewis basic group, and an aromatic ring-containing hydrophobic group.

A nonaqueous electrolyte secondary battery according to an aspect of the present disclosure includes an electrode assembly including the above positive electrode, a negative electrode and a separator, and a nonaqueous electrolyte.

According to one aspect of the present disclosure, a Ni-excess lithium transition metal composite oxide is used as a positive electrode active material in a way that the active material maintains a good electrical connection with a carbon material, and thereby it becomes possible to reduce the decrease in battery capacity after charging and discharging cycles.

BRIEF DESCRIPTION OF DRAWING

FIG. 1 is a sectional view of a nonaqueous electrolyte secondary battery according to an example embodiment.

DESCRIPTION OF EMBODIMENTS

As mentioned earlier, it is an important challenge to maintain a good electrical connection between a positive electrode active material and a carbon material and thereby reduce the decrease in battery capacity after charging and discharging cycles. The present inventors carried out extensive studies to solve this challenge and have found that the decrease in capacity caused by charging and discharging cycles is specifically reduced when a Ni-excess lithium transition metal composite oxide is used as a positive electrode active material with high energy density together with the addition, to the mixture layer, of an adhesion improver which contains a Lewis acidic group, a Lewis basic group, and an aromatic ring-containing hydrophobic group. The adhesion improver is preferably used in combination with a binder such as polyvinylidene fluoride (PVdF).

In a positive electrode mixture layer, a positive electrode active material changes its volume during charging and discharging of a battery, and this volume change weakens the degree of contact between the active material and a carbon material, resulting in a decrease in the conductivity of the mixture layer and a decrease in battery capacity. By the addition of the above adhesion improver to the mixture layer, the active material and the carbon material are allowed to maintain a good adhesion and a good electrical connection therebetween, and consequently the decrease in the conductivity of the mixture layer is reduced.

Ni-containing lithium transition metal composite oxides tend to have a higher average valence on the surface with increasing Ni proportion. This tendency is marked when the Ni proportion exceeds 50%, and lithium transition metal composite oxides containing 50% or more Ni contain a large amount of lithium hydroxide as a basic component remaining on the surface. Because of the high surface basicity of a lithium transition metal composite oxide containing 50% or more Ni, the adhesion improver will be easily adsorbed to the composite oxide by way of the acid-base interaction between the surface and the Lewis acidic groups in the adhesion improver. Further, the aromatic ring-containing hydrophobic groups will be easily adsorbed to a carbon material by virtue of the $\pi$-$\pi$ interaction with aromatic rings such as benzene present on the surface of the carbon material. That is, the adhesion improver adsorbs to both the composite oxide and the carbon material.

When there are no Lewis basic groups in the adhesion improver, the adhesion improver cannot offer a small decrease in capacity and cannot allow the active material and the carbon material to maintain a good adhesion and a good electrical connection therebetween (see COMPARATIVE EXAMPLE 1 described later). For example, the Lewis basic groups will impart to the adhesion improver stability in a positive electrode mixture slurry, and will also impart to the adhesion improver stability in a nonaqueous electrolyte. In particular, Lewis basic groups having a high molecular weight easily move flexibly in the presence of a nonaqueous electrolyte and thus easily follow a volume change of the active material, and will therefore play an important role in maintaining a good adhesion between the active material and the carbon material.

While details will be described later, the Lewis basic group is preferably polyethylene oxide or polypropylene oxide. The molecular weight of the Lewis basic group is preferably 200 to 10000, and particularly preferably 500 to 2000.

Hereinbelow, an example embodiment will be described in detail. The following will illustrate a cylindrical battery in which a wound electrode assembly 14 is accommodated in a cylindrical battery case. However, the structure of the electrode assembly is not limited to such a coil, and may be a stack of a plurality of positive electrodes and a plurality of negative electrodes stacked alternately on top of one another via separators. The battery case is not limited to a cylindrical shape, and may be, for example, a metallic case such as a prismatic case (a prismatic battery) or a coin-shaped case (a coin-shaped battery), or a resin case (a laminate battery) made of resin films.

FIG. 1 is a sectional view of a nonaqueous electrolyte secondary battery 10 according to an example embodiment. As illustrated in FIG. 1, the nonaqueous electrolyte secondary battery 10 includes an electrode assembly 14, a nonaqueous electrolyte (not shown), and a battery case 15 in which the electrode assembly 14 and the nonaqueous electrolyte are accommodated. The electrode assembly 14 includes a positive electrode 11, a negative electrode 12 and a separator 13. The positive electrode 11 and the negative electrode 12 are wound together via the separator 13 to form a wound structure. The battery case 15 is composed of a bottomed cylindrical exterior case 16, and a seal body 17 which seals the opening of the exterior case 16.

The nonaqueous electrolyte includes a nonaqueous solvent and an electrolyte salt dissolved in the nonaqueous solvent. Examples of the nonaqueous solvents include esters, ethers, nitriles, amides, and mixtures of two or more kinds of these solvents. The nonaqueous solvent may include a halogenated solvent resulting from the substitution of the above solvent with a halogen atom such as fluorine in place of at least part of hydrogen. The nonaqueous electrolyte is not limited to a liquid electrolyte, and may be a solid electrolyte such as a gel polymer. For example, a lithium salt such as $LiPF_6$ is used as the electrolyte salt.

The nonaqueous electrolyte secondary battery 10 includes insulating plates 18, 19 disposed on and under the electrode assembly 14, respectively. In the example illustrated in FIG. 1, a positive electrode lead 20 attached to the positive electrode 11 extends toward the seal body 17 through a through-hole in the insulating plate 18, and a negative electrode lead 21 attached to the negative electrode 12 extends along the outside of the insulating plate 19 to the bottom of the exterior case 16. The positive electrode lead 20 is connected by welding or the like to the lower side of a filter 23 that is a bottom plate of the seal body 17. Thus, a cap 27 that is a top plate of the seal body 17 and is electrically connected to the filter 23 serves as a positive electrode terminal. The negative electrode lead 21 is connected by welding or the like to the inner side of the bottom of the exterior case 16, thus allowing the exterior case 16 to serve as a negative electrode terminal.

For example, the exterior case 16 is a bottomed cylindrical metallic case. A gasket 28 is disposed between the exterior case 16 and the seal body 17, thus ensuring tightness in the inside of the battery. The exterior case 16 has an overhang 22 which is defined by, for example, a lateral portion projecting toward the inside and which supports the seal body 17. The overhang 22 is preferably an annular portion which extends along the circumference of the exterior case 16, and supports the seal body 17 on the upper side thereof.

The seal body 17 has a structure in which the filter 23, a lower valve 24, an insulating member 25, an upper valve 26 and the cap 27 are stacked in this order from the side adjacent to the electrode assembly 14. For example, the members constituting the seal body 17 have a disk shape or a ring shape, and the members except the insulating member 25 are electrically connected to one another. The lower valve 24 and the upper valve 26 are connected to each other in the respective central portions, and the insulating member 25 is interposed between peripheral portions of the valves. In the event that the inner pressure of the battery is increased by abnormal heat generation, the lower valve 24 is deformed so as to push the upper valve 26 toward the cap 27 and ruptures to interrupt the current path between the lower valve 24 and the upper valve 26. If the inner pressure is further raised, the upper valve 26 is ruptured and allows the gas to be discharged through the opening in the cap 27.

Hereinbelow, the electrode assembly 14 will be described in detail, with particular emphasis placed on the positive electrode 11.

[Positive Electrodes]

The positive electrode 11 includes a positive electrode current collector 30 and a positive electrode mixture layer 31 disposed on the current collector. The positive electrode current collector 30 may be, for example, a foil of a metal that is stable at the potentials of the positive electrode 11, such as aluminum, or a film having such a metal as a skin layer. The positive electrode mixture layer 31 includes a lithium transition metal composite oxide, a conductive carbon material, and an adhesion improver capable of attaching to the lithium transition metal composite oxide and the carbon material. By the addition of the adhesion improver to the positive electrode mixture layer 31, the lithium transition metal composite oxide as the positive electrode active material and the carbon material serving as a conductive agent are allowed to maintain a good adhesion and a good electrical connection therebetween, and consequently the decrease in capacity caused by charging and discharging cycles is highly reduced.

Preferably, the positive electrode mixture layer 31 includes a known binder and is formed on both sides of the positive electrode current collector 30. While the adhesion improver alone can bind together the positive electrode active material and the carbon material, the combined use of the adhesion improver and a known binder is preferable. The positive electrode 11 may be fabricated by applying a positive electrode mixture slurry including components such as the positive electrode active material, the carbon material, the binder and the adhesion improver onto the positive electrode current collector 30, drying the wet films, and rolling the coatings to form positive electrode mixture layers 31 on both sides of the positive electrode current collector 30.

The lithium transition metal composite oxide is a composite oxide containing 50 mol % or more Ni relative to the total number of moles of the metal element or elements except Li, and serves as a positive electrode active material with high energy density. Particularly preferably, the lithium transition metal composite oxide contains 80 mol % or more Ni relative to the total number of moles of the metal element or elements except Li. The lithium transition metal composite oxide may contain metal elements other than Li and Ni, and preferably contains at least one selected from Co, Mn and Al.

A preferred example of the lithium transition metal composite oxides is a composite oxide represented by the general formula $Li_xNi_{1-y-z}Co_yM_zO_2$ (wherein $0.9 \le x \le 1.3$, $0 < y+z < 0.2$, and M includes at least one of Mn and Al). Besides Li, Ni, Co, Mn and Al, the composite oxide may include at least one metal element M selected from Zr, B, Mg, Ti, Fe, Cu, Zn, Sn, Na, K, Ba, Sr, Ca, W, Mo, Nb and Si. The surface of the lithium transition metal composite oxide particles may be coated with microparticles of an oxide such as aluminum oxide or an inorganic compound such as a phosphoric acid compound or a boric acid compound. The Ni-excess lithium transition metal composite oxide may be used in combination with other positive electrode active material.

The conductive carbon material contained in the positive electrode mixture layer 31 is in contact with the surface of the positive electrode active material particles and ensures the electron conductivity of the positive electrode mixture layer 31. Suitable examples of the carbon materials include carbon blacks such as acetylene black and Ketjen black, and graphites. The carbon materials may be used singly, or two or more may be used in combination. The amount of the carbon material is, for example, 0.1 to 10 parts by mass, and preferably 0.5 to 2 parts by mass per 100 parts by mass of the positive electrode active material.

Examples of the binders contained in the positive electrode mixture layer 31 include fluororesins such as polytetrafluoroethylene (PTFE) and polyvinylidene fluoride (PVdF), polyvinylpyrrolidones (PVP), polyacrylonitriles (PAN), polyimide resins, acrylic resins and polyolefin resins. These resins may be used in combination with, for example, carboxymethylcellulose (CMC) or a salt thereof, or polyethylene oxide (PEO). The binders may be used singly, or two or more may be used in combination. The amount of the binder is, for example, 0.1 to 3 parts by mass, and preferably 0.5 to 2 parts by mass per 100 parts by mass of the positive electrode active material.

The adhesion improver contains a Lewis acidic group, a Lewis basic group, and an aromatic ring-containing hydrophobic group. The adhesion improver adsorbs to both the Ni-excess lithium transition metal composite oxide and the carbon material by way of the acid-base interaction between the Lewis acidic groups and the composite oxide, and also the π-π interaction between the aromatic ring-containing hydrophobic groups and the carbon material. The Lewis basic groups enhance the stability of the adhesion improver in the presence of a nonaqueous electrolyte, and also elongate and contract in conformity with a volume change of the composite oxide, and will therefore play an important role in maintaining a good adhesion between the composite oxide and the carbon material.

The adhesion improver preferably has a molecular structure represented by Ac—Ba—Ar. In the formula, Ac denotes a Lewis acidic group, Ba a Lewis basic group, and Ar an aromatic ring-containing hydrophobic group. That is, it is preferable that the Lewis basic group be present between the Lewis acidic group which adsorbs to the positive electrode active material, and the hydrophobic group which adsorbs to the carbon material. Such a molecular structure easily stays adsorbed to the positive electrode active material and the carbon material even when the active material swells and shrinks.

The Lewis acidic group may be any electron pair-accepting functional group, and is preferably an anionic group. Examples of the anionic groups include sulfo group, carboxyl group, phosphate esters, nitrate esters, and salts thereof (such as amine salts, ammonium salts and sodium salts). In particular, a sulfo acid group, a carboxyl group, or a phosphate ester is preferable.

The Lewis acidic groups may form an ester bond with the Lewis basic groups. When, for example, the Lewis acidic groups are a phosphate ester, the ester may be a monoester, a diester or a mixture thereof, and is preferably a monoester or a mixture of a monoester and a diester.

The Lewis basic group may be any electron pair-donating functional group, and is preferably a nonionic group. Preferred examples of the nonionic groups include polyethylene oxide (PEO), polypropylene oxide (PPO), and copolymers of PEO and PPO. In particular, PEO or PPO is preferable, and PEO is particularly preferable. When PPO or PEO having a high polarity is used as the Lewis basic group, the adhesion improver is stable in a positive electrode mixture slurry and in a nonaqueous electrolyte, and is less likely to cause problems such as aggregation.

For example, the molecular weight of the Lewis basic group is 200 to 10000, and preferably 500 to 2000. When the molecular weight is in this range, the adhesion improver will exhibit enhanced stability in a nonaqueous electrolyte, and will easily elongate and contract in conformity with a volume change of the positive electrode active material. The molecular weight of the Lewis basic group is measured by GPC.

The hydrophobic group may be any such group containing an aromatic ring. Examples thereof include phenyl group, styryl group, benzyl group, tolyl group, trityl group, naphthyl group, and aromatic hydrocarbon groups represented by the following formula. In particular, a phenyl group, a styryl group, an aryl group, or an aromatic hydrocarbon group of the following formula that is a combination of the above groups is preferable.

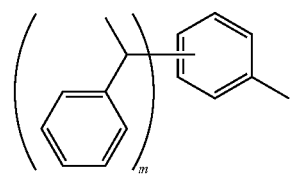

[Chem. 1]

In the above formula, m is about 3.

Specific examples of preferred adhesion improvers include polyoxyethylene allylphenyl ether phosphates. For example, the polyoxyethylene allylphenyl ether phosphate includes a Ba—Ar component represented by the following formula.

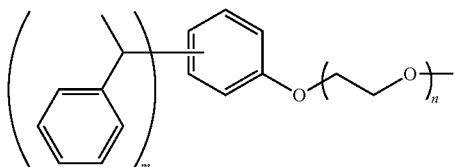

In the above formula, m is about 3, and n is about 20. The polyoxyethylene allylphenyl ether phosphate is preferably a monoester phosphate, a diphosphate, or a mixture of a monophosphate and a diphosphate.

For example, the amount of the adhesion improver is 0.001 to 1 part by mass, and preferably 0.01 to 0.1 part by mass per 100 parts by mass of the positive electrode active material. When the amount is in this range, the adhesion improver easily maintains a good adhesion and a good electrical connection between the positive electrode active material and the carbon material.

The adhesion improver may be added to the positive electrode mixture layer by adding the adhesion improver during the preparation of a positive electrode mixture slurry. Alternatively, the adhesion improver and the carbon material may be mixed together with a dispersion medium such as N-methyl-2-pyrrolidone to give a carbon paste, and the paste may be used in the preparation of a positive electrode slurry. The carbon paste may include a general dispersant such as a polymer material selected from PVdF, PVP, PEO, PPO and celluloses including CMC, an amine compound, or an alkyl ether compound.

[Negative Electrodes]

The negative electrode 12 includes a negative electrode current collector and a negative electrode mixture layer disposed on the current collector. The negative electrode current collector may be, for example, a foil of a metal that is stable at the negative electrode potentials, such as copper, or a film having such a metal as a skin layer. The negative electrode mixture layer includes a negative electrode active material and a binder, and is formed on both sides of the negative electrode current collector. The negative electrode may be fabricated by applying a negative electrode mixture slurry including components such as a negative electrode active material and a binder onto the negative electrode current collector, drying the wet films, and rolling the coatings to form negative electrode mixture layers on both sides of the negative electrode current collector.

The negative electrode active material is not particularly limited as long as it can reversibly store and release lithium ions. Examples thereof include carbon materials such as natural graphite and artificial graphite, metals which can be alloyed with Li such as silicon (Si) and tin (Sn), and oxides containing such metals as Si and Sn. The negative electrode mixture layers may include lithium titanium composite oxide. The lithium titanium composite oxide functions as a negative electrode active material. When the lithium titanium composite oxide is used, it is preferable that a conductive agent such as carbon black be added to the negative electrode mixture layers.

Examples of the binders contained in the negative electrode mixture layers include fluororesins such as PTFE and PVdF, PVP, PAN, polyimide resins, acrylic resins and polyolefin resins, similarly to the case of the positive electrode 11. When the negative electrode mixture slurry is prepared using an aqueous solvent, for example, CMC or a salt thereof, styrene-butadiene rubber (SBR), polyacrylic acid (PAA) or a salt thereof, or polyvinyl alcohol (PVA) may be used as the binder.

[Separators]

The separator 13 may be a porous sheet having ion permeability and insulating properties. Specific examples of the porous sheets include microporous thin films, woven fabrics and nonwoven fabrics. Some preferred materials of the separators 13 are olefin resins such as polyethylene and polypropylene, and celluloses. The separator 13 may be a monolayer structure or a stack structure. For example, the surface of the separator 13 may have a porous layer containing an inorganic compound filler, or a porous layer formed of a highly heat resistant resin such as aramid resin.

EXAMPLES

Hereinbelow, the present disclosure will be further described based on EXAMPLES. However, it should be construed that the scope of the present disclosure is not limited to such EXAMPLES.

Example 1

[Preparation of Carbon Paste]

In N-methyl-2-pyrrolidone (NMP), acetylene black, PVdF and polyoxyethylene allylphenyl ether phosphate were mixed together in a mass ratio of 100:5:5 to give a carbon paste.

[Fabrication of Positive Electrode]

Lithium transition metal composite oxide represented by $LiNi_{0.88}Co_{0.09}Al_{0.03}O_2$ was used as a positive electrode active material. The positive electrode active material, the carbon paste and PVdF were mixed together in a solid mass ratio of 100:1:1. NMP was added. A positive electrode mixture slurry was thus prepared. Next, the positive electrode mixture slurry was applied to both sides of an aluminum foil as a positive electrode current collector. The wet films were dried, and the coatings (positive electrode mixture layers) were rolled with a roll press machine. Thereafter, the coated foil was cut to a predetermined electrode size. A positive electrode (a working electrode) was thus obtained which had mixture layers on both sides of the current collector. A positive electrode lead made of aluminum was attached to a portion of the positive electrode current collector exposed from the mixture layer.

The polyoxyethylene allylphenyl ether phosphate added to the positive electrode mixture layers had a Ba—Ar component represented by the following formula.

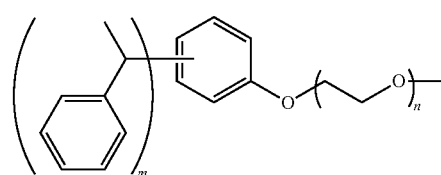

In the above formula, m is about 3 and n is about 20 (the molecular weight is about 1000).

[Fabrication of Test Cell]

Separators were arranged between each pair of the above working electrode, a counter electrode and a reference electrode, and the electrode assembly was inserted into an exterior case. Thereafter, an electrolytic solution was poured into the exterior case, which was then tightly closed. A test cell was thus fabricated. The design capacity of the test cell was 100 mAh.

The counter electrode, the reference electrode, the separators and the electrolytic solution were the following.

Counter electrode: lithium metal
Reference electrode: lithium metal
Separators: polyethylene separators
Electrolytic solution: $LiPF_6$ was dissolved with a concentration of 1.0 mol/L into a nonaqueous solvent obtained by mixing ethylene carbonate (EC) and methyl ethyl carbonate (MEC) in 30:70 volume ratio.

Comparative Example 1

A positive electrode and a test cell were fabricated in the same manner as in EXAMPLE 1, except that the polyoxyethylene allylphenyl ether phosphate used in the preparation of a carbon paste was replaced by polyoxyethylene allylphenyl ether.

Comparative Example 2

A positive electrode and a test cell were fabricated in the same manner as in EXAMPLE 1, except that the polyoxyethylene allylphenyl ether phosphate was not used in the preparation of a carbon paste.

The batteries of EXAMPLE and COMPARATIVE EXAMPLES were cycle tested in the following manner to measure the capacity deterioration ratio (%) after 15 cycles. The evaluation results are described in Table 1.

[Cycle Test]

In an environment at 25° C., the battery was charged at a constant current of 50 mA to a battery voltage of 4.2 V, and was thereafter charged at a constant voltage of 4.2 V to a cutoff current of 2 mA. After a rest of 10 minutes, the battery was discharged at a constant current of 50 mA to a battery voltage of 3.0 V. This cycle of charging and discharging was repeated 15 times. The discharge capacity after 15 cycles was compared to the initial discharge capacity, and the capacity deterioration ratio was calculated.

TABLE 1

| | Additive (adhesion improver) in mixture layer | | Capacity deterioration ratio (%) |
|---|---|---|---|
| | Composition | Amount (parts by mass) | |
| EX. 1 | Polyoxyethylene allylphenyl ether phosphate | 0.05 | 7.9 |
| COMP. EX. 1 | Polyoxyethylene allylphenyl ether | 0.05 | 9.7 |
| COMP. EX. 2 | — | — | 9.8 |

The results in Table 1 show that the battery of EXAMPLE 1 in which the positive electrode mixture layers contained a polyoxyethylene allylphenyl ether phosphate attained a lower capacity deterioration ratio after 15 cycles than the batteries of COMPARATIVE EXAMPLES 1 and 2. In the battery of COMPARATIVE EXAMPLE 1, the lithium transition metal oxide as the positive electrode active material contained not less than 50% Ni and hence lithium hydroxide was present on the surface of the positive electrode active material. Thus, the electrical resistance between the positive electrode active material and the carbon material was high, and a capacity deterioration was facilitated. The battery of EXAMPLE 1 achieved a low capacity deterioration ratio probably because the adhesion improver including a Lewis acid component, a Lewis base component and an aromatic component allowed the positive electrode active material and the carbon material to maintain a good adhesion and a good electrical connection therebetween. The polyoxyethylene allylphenyl ether used in the battery of COMPARATIVE EXAMPLE 1 contained no Lewis acidic group component and had no function to reduce the capacity deterioration.

REFERENCE SIGNS LIST

10 NONAQUEOUS ELECTROLYTE SECONDARY BATTERY
11 POSITIVE ELECTRODE
12 NEGATIVE ELECTRODE
13 SEPARATOR
14 ELECTRODE ASSEMBLY
15 BATTERY CASE
16 EXTERIOR CASE
17 SEAL BODY
18, 19 INSULATING PLATES
20 POSITIVE ELECTRODE LEAD
21 NEGATIVE ELECTRODE LEAD
22 OVERHANG
23 FILTER
24 LOWER VALVE
25 INSULATING MEMBER
26 UPPER VALVE
27 CAP
28 GASKET
30 POSITIVE ELECTRODE CURRENT COLLECTOR
31 POSITIVE ELECTRODE MIXTURE LAYER

The invention claimed is:

1. A positive electrode for nonaqueous electrolyte secondary batteries comprising a current collector and a mixture layer disposed on the current collector, wherein the mixture layer comprises a lithium transition metal composite oxide containing 50 mol % or more Ni relative to the total number of moles of metal element or elements except Li, a conductive carbon material, an adhesion improver capable of attaching to the lithium transition metal composite oxide and the carbon material, and a dispersion medium, and the adhesion improver is a polyoxyethylene allylphenyl ether phosphate, the polyoxyethylene allylphenyl ether phosphate has a molecular structure represented by the following formula:

[Formula 1] Ac-Ba-Ar wherein Ac denotes a Lewis acidic group, Ba a Lewis basic group, and Ar an aromatic ring-containing hydrophobic group, the Lewis basic group has a molecular weight of 500 to 2000, and the dispersion medium is N-methyl-2-pyrrolidone.

2. The positive electrode for nonaqueous electrolyte secondary batteries according to claim 1, wherein the lithium transition metal composite oxide is a composite oxide represented by the following formula:

[Formula 3] $Li_xNi_{1-y-z}Co_yM_zO_2$ wherein $0.9 \leq x \leq 1.3$, $0 < y+z < 0.2$, and M includes at least one of Mn and Al.

3. The positive electrode for nonaqueous electrolyte secondary batteries according to claim 1, wherein the mixture layer further comprises polyvinylidene fluoride as a binder.

4. A nonaqueous electrolyte secondary battery comprising an electrode assembly comprising the positive electrode described in claim 1, a negative electrode and a separator, and a nonaqueous electrolyte.

\* \* \* \* \*